United States Patent
Li et al.

(10) Patent No.: US 10,171,128 B2
(45) Date of Patent: Jan. 1, 2019

(54) DATA TRANSMISSION METHOD AND APPARATUS

(71) Applicant: ZTE CORPORATION, Shenzhen, Guangdong Province (CN)

(72) Inventors: Weimin Li, Shenzhen (CN); Zhifeng Yuan, Shenzhen (CN); Zhaohua Lu, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 0 days.

(21) Appl. No.: 15/550,231

(22) PCT Filed: Jan. 7, 2016

(86) PCT No.: PCT/CN2016/070416
§ 371 (c)(1),
(2) Date: Aug. 10, 2017

(87) PCT Pub. No.: WO2016/127746
PCT Pub. Date: Aug. 18, 2016

(65) Prior Publication Data
US 2018/0034501 A1    Feb. 1, 2018

(30) Foreign Application Priority Data
Feb. 13, 2015  (CN) .......................... 2015 1 0081614

(51) Int. Cl.
*H04B 1/7103*    (2011.01)
(52) U.S. Cl.
CPC .................................. *H04B 1/7103* (2013.01)

(58) Field of Classification Search
CPC ..................................................... H04B 1/7103
USPC .................................. 375/146; 370/329, 208
See application file for complete search history.

(56) References Cited

U.S. PATENT DOCUMENTS

| | | | |
|---|---|---|---|
| 6,049,535 A | 4/2000 | Ozukturk et al. | |
| 2006/0098569 A1* | 5/2006 | Han | H04L 5/0048 370/208 |
| 2010/0272040 A1* | 10/2010 | Nam | H04J 13/0077 370/329 |
| 2012/0082023 A1 | 4/2012 | Higuchi et al. | |
| 2014/0355555 A1* | 12/2014 | Han | H04L 1/0041 370/329 |

FOREIGN PATENT DOCUMENTS

| | | |
|---|---|---|
| CN | 1270721 A | 10/2000 |
| CN | 1968029 A | 5/2007 |

(Continued)

OTHER PUBLICATIONS

Motorola, EUTRA SC-FDMA Uplink Pilot/Reference Signal Design, 3GPP RAN WG1 #47, Riga, Latvia, Nov. 6-10, 2006, R1-063057.

*Primary Examiner* — Chieh M Fan
*Assistant Examiner* — Fitwi Hailegiorgis
(74) *Attorney, Agent, or Firm* — Ling Wu; Stephen Yang; Ling and Yang Intellectual Property (57) ABSTRACT

A data transmission method includes the following steps: determining a transmission resource to be used and a complex-valued spreading sequence to be used; processing a data symbol to be sent by using the complex-valued spreading sequence to generate a symbol sequence; and sending the symbol sequence through the transmission resource.

18 Claims, 4 Drawing Sheets

(56) References Cited

FOREIGN PATENT DOCUMENTS

| | | | |
|---|---|---|---|
| CN | 101019457 | A | 8/2007 |
| CN | 101057432 | A | 10/2007 |
| CN | 101262467 | A | 9/2008 |
| CN | 101567865 | A | 10/2009 |
| CN | 101645731 | A | 2/2010 |
| CN | 102215571 | A | 10/2011 |
| JP | 2010-506443 | A | 2/2010 |
| JP | 2010-206532 | A | 9/2010 |
| JP | 2010-539755 | A | 12/2010 |
| JP | WO2014155494 | A1 | 10/2014 |
| WO | 2007070002 | A2 | 6/2007 |

\* cited by examiner

DATA TRANSMISSION METHOD AND APPARATUS

TECHNICAL FIELD

The present disclosure relates to, but is not limited to, the field of wireless communication, and more particularly, to a method and apparatus for transmitting data.

BACKGROUND

Uplink multi-user access communication can be implemented by different multiple access technologies, such as Time Division Multiple Access (TDMA), Frequency Division Multiple Access (FDMA), Code Division Multiple Access (CDMA) and Space Division Multiple Access (SDMA). The Code Division Multiple Access (CDMA) technology, which is one very important category that implements the uplink multi-user access communication, can provide an excellent access performance, and has been adopted by a number of wireless communication standards.

For an access process using CDMA, firstly a plurality of access terminals perform spreading processing on data symbol, obtained after amplitude and phase modulation (such as Quadrature Amplitude Modulation (QAM)) is performed on data to be sent, by using a spreading sequence with a certain length (such as a spreading sequence with a length of L formed by L data symbol or L data elements), respectively. The spreading processing refers to a process in which each modulated data symbol is multiplied by each symbol of the spreading sequence to form a symbol sequence with the same length as that of the used spreading sequence. Specifically, each modulated data symbol (such as a corresponding constellation point symbol obtained after QAM is performed on data to be sent) is multiplied by each symbol of the spreading sequence with the length of L, such that each modulated data symbol is spread to be a symbol sequence with the same length as that of the used spreading sequence, i.e., each modulated data symbol will be spread to be L symbols, which is equivalent to that each modulated data symbol is carried by the spreading sequence of the length L. Then, the symbol sequence, obtained after spreading processing, of the plurality of access terminals may be sent on the same time-frequency resources. Finally, a base station receives signals superimposing the spread signals of the plurality of access terminals together after wireless propagation, and separates useful information of each of the terminals from the received superimposed signals through the multi-user receiving detection technology.

The CDMA falls into the category of spread spectrum communication. Since the modulated data symbol of the terminal will be spread to be L symbols after spreading processing is performed on the modulated data symbol of the terminal by using the spreading sequence of the length L, if transmission time of the L symbols after the spreading processing is required to be equal to transmission time of the data symbol before the spreading, then a bandwidth required to transmit the L symbols after the spreading processing needs to be spread by L times, thus the spreading sequence is often referred as a spread spectrum sequence.

The symbols obtained after the spreading processing by the access terminals may be transmitted in the multi-carrier technology (such as Orthogonal Frequency Division Multiplexing (OFDM) and Filter-Bank Multi-Carrier (FBMC)). The combination of the code division multiple access and the multi-carrier technology is the Multi-Carrier Code Division Multiple Access (MC-CDMA) technology.

In the CDMA technology, a spreading processing process of a transmitter is relatively simple: each modulated data symbol is multiplied by each symbol of the spreading sequence with the length L to obtain the L spreading-processed symbols, and then the L symbols are transmitted through the single-carrier technology or multi-carrier technology. However, a receiving process of a receiver of a base station is relatively complicated. How the receiver of the base station separates accurately useful data information of each terminal from the superimposed signals to ensure the multiple access performance of the CDMA system is the key of the CDMA system, which involves two aspects, i.e., the spreading sequence and the receiver. The selection of the spreading sequence is the basis of the performance, and the design of the receiver is the guarantee of the performance.

Specifically, to obtain an excellent multiple access performance, excellent cross-correlation characteristics are required between spreading sequences used by different terminals. If the single carrier code division multiplexing technology is used, the spreading sequences used by the terminals are required to have better auto-correlation characteristics to resist the impact of multipath delay spread. While the multi-carrier code division multiplexing technology can resist the impact of multipath delay spread by means of the multi-carrier technology, and the design of the spreading sequence of the multi-carrier code division multiplexing technology may consider emphatically the cross-correlation characteristics facilitating the receiver to separate multi-user information.

On the basis of the design of the spreading sequence, the base station can use the multi-user receiving detection technology with a high performance to separate the multi-user information to obtain the excellent multiple access performance, such as a successive interference cancellation (SIC) receiving detection technology. However, the complexity of the multi-user receiving detection technology with a high performance is relatively higher.

The selection and design of the spreading sequence are important aspects of the CDMA technology. A Direct Sequence-Code Division Multiple Access (DS-CDMA) technology as a common CDMA technology has been used as an uplink multi-user access technology of a plurality of wireless communication standards and systems. The spreading sequence of the DS-CDMA technology uses a simple binary pseudo-noise (PN) real number sequence. Moreover, the DS-CDMA based on the binary PN real number sequence is also applied to the MC-CDMA technology. The binary pseudo-noise real number sequence may also be referred as a binary pseudo-noise sequence, and a value of each element or symbol of the binary pseudo-noise real number sequence is usually denoted as 0 or 1. The binary pseudo-noise real number sequence can be further represented as a bipolar sequence, that is, 0 is denoted as +1, 1 is denoted as −1, or, 0 is denoted as −1, 1 is denoted as +1.

The design of the spreading sequence further needs to consider the length of the spreading sequence. The longer the spreading sequences are, the more easily the low cross-correlation characteristics between the spreading sequences used by different terminals can be guaranteed, and the more easily more sequences with the low cross-correlation characteristics can be selected, therefore simultaneous access of more terminals can be supported. If the number of the simultaneously accessed terminals is greater than the length of the spreading sequences, then it is considered that the system is in an overload state.

Supporting simultaneous access of a large number of users to the system for communication is an important demand for future wireless communications, which can be implemented by designing a multi-user access communication system based on the code division multiple access with a better overload capacity.

From the perspective of multi-user information theory, greater system capacity or marginal throughput can be obtained by using a non-orthogonal multiple access mode than an orthogonal multiple access mode on the uplink. Therefore, to provide a flexible system design and support simultaneous access of more users, different access terminals may use non-orthogonal spreading sequences. Since the spreading sequences of different access terminals are not mutually orthogonal, the receiving detection performance of each of the access terminals will get worse as the number of simultaneously accessed terminals increases, and interference among multiple users will become more serious as the system is overloaded.

The length of the spreading sequence based on a binary pseudo-noise real number sequence, which is used by the current code division multiple access technology, is relatively longer. When a larger number of user terminals access the system or when the system is overloaded, by using a traditional receiver (such as a Rake receiver) the performance is poor, while by using an interference cancellation receiver (such as an SIC receiver) the receiving detection complexity is very high and the delay is also very great. If binary pseudo-noise real number sequences with a shorter length is used, then the low cross-correlation between the sequences cannot be guaranteed, and serious interference among multiple users will occur when a large number of user terminals access the system or the system is overloaded, which would further influence the multi-user receiving detection performance and the multi-user access communication performance.

SUMMARY

The following is a summary of the subject matter described herein in detail. This summary is not intended to limit the protection scope of the claims.

Embodiments of the present disclosure provides a data transmission method and apparatus to solve the problem in the existing art that the interference among multiple users is serious and the receiving detection complexity is high, which influence the multi-user receiving detection performance and the multi-user access communication performance.

An embodiment of the present disclosure provides a data transmission method including the following steps: determining a transmission resource to be used and complex-valued spreading sequence to be used; processing a data symbol to be sent by using the complex-valued spreading sequence to generate a symbol sequence; and sending the symbol sequence through the transmission resource.

In an exemplary embodiment, determining a transmission resource to be used and a complex-valued spreading sequence to be used includes one of the following manners:

determining the transmission resource to be used and the complex-valued spreading sequence to be used respectively;

determining the transmission resource to be used firstly, and then determining the complex-valued spreading sequence to be used according to the transmission resource; and determining the complex-valued spreading sequence to be used firstly, and then determining the transmission resource to be used according to the complex-valued spreading sequence.

In an exemplary embodiment, determining the transmission resource to be used includes: determining the transmission resource to be used according to a fixed configuration of a system, indication signaling sent by the system, or identification information of a transmitter.

In an exemplary embodiment, determining the complex-valued spreading sequence to be used includes one of the following manners:

determining the complex-valued spreading sequence to be used according to a fixed configuration of a system, indication signaling sent by the system, identification information of a transmitter or a random generation manner;

determining a complex-valued spreading sequence set in which the complex-valued spreading sequence to be used is located according to the fixed configuration of the system, the indication signaling sent by the system or the identification information of the transmitter; and determining the complex-valued spreading sequence to be used from the complex-valued spreading sequence set according to the fixed configuration of the system, the indication signaling sent by the system, the identification information of the transmitter or a random selection manner.

In an exemplary embodiment, determining the complex-valued spreading sequence to be used according to the transmission resource includes one of the following manners:

determining the complex-valued spreading sequence to be used according to the transmission resource and the identification information of the transmitter based on a rule preset by a system or a random generation manner;

determining V complex-valued spreading sequence sets associated with transmission resources according to an association relationship, predetermined by the system, between the transmission resources and complex-valued spreading sequence sets, and selecting W complex-valued spreading sequences from the V complex-valued spreading sequence sets as complex-valued spreading sequences to be used according to a fixed configuration of the system, indication signaling sent by the system, identification information of a transmitter or a random selection manner, herein V is an integer greater than or equal to 1, and W is an integer greater than or equal to 1.

In an exemplary embodiment, determining the transmission resource to be used according to the complex-valued spreading sequence includes: determining Y transmission resources associated with complex-valued spreading sequence sets according to a complex-valued spreading sequence set in which the complex-valued spreading sequence is located and an association relationship, predetermined by a system, between the transmission resources and the complex-valued spreading sequence sets, and selecting Z transmission resources from the Y transmission resources as transmission resources to be used according to a fixed configuration of a system, indication signaling sent by the system or identification information of a transmitter, herein Y is an integer greater than or equal to 1, and Z is an integer greater than or equal to 1.

In an exemplary embodiment, the identification information of the transmitter at least includes one of: a serial number of the transmitter, an identification number of the transmitter, a position of the transmitter and a network address of the transmitter.

In an exemplary embodiment, the association relationship, predetermined by the system, between the transmission resources and the complex-valued spreading sequence sets includes at least one of:

a one-to-one corresponding relationship between one transmission resource and one complex-valued spreading sequence set;

a corresponding relationship between one transmission resource and a plurality of complex-valued spreading sequence sets;

a corresponding relationship between a plurality of transmission resources and one complex-valued spreading sequence set; and a corresponding relationship between a plurality of transmission resources and a plurality of complex-valued spreading sequence sets.

In an exemplary embodiment, determining a transmission resource to be used includes: determining the transmission resource to be used based on N transmission resources predetermined by a system, herein each transmission resource is a transmission resource unit, a transmission resource block or a transmission resource set, N being an integer greater than or equal to 1.

In an exemplary embodiment, determining a complex-valued spreading sequence to be used includes: determining the complex-valued spreading sequence to be used based on S complex-valued spreading sequence sets predetermined by a system, herein each complex-valued spreading sequence set includes X complex-valued spreading sequences with a length of L, and S is an integer greater than or equal to 1, and X is an integer greater than or equal to 1, and L is an integer greater than 1.

In an exemplary embodiment, each element of the complex-valued spreading sequence is a complex number, and values of a real part and an imaginary part of each element are both from an M-element real number set, herein the M is an integer greater than or equal to 2.

In an exemplary embodiment, the M-element real number set includes one of:

a set formed by M integers within a range of $[-(M-1)/2, (M-1)/2]$, herein the M is an odd number;

a set formed by M odd numbers within a range of $[-(M-1), (M-1)]$, herein the M is an even number;

a set formed by M real numbers obtained through multiplying respectively M integers within a range of $[-(M-1)/2, (M-1)/2]$ by a specified coefficient, herein the M is an odd number; and a set formed by M real numbers obtained through multiplying respectively M odd numbers within a range of $[-(M-1), (M-1)]$ by a specified coefficient, herein the M is an even number.

In an exemplary embodiment, processing a data symbol to be sent by using the complex-valued spreading sequence to generate the symbol sequence includes: performing a spreading processing on the data symbol to be sent by using the complex-valued spreading sequence to generate the spread symbol sequence.

In an exemplary embodiment, sending the symbol sequence through the transmission resource includes: mapping the symbol sequence to the transmission resource to form transmitting signals, and sending the transmitting signals out.

An embodiment of the present disclosure further provides a data transmission apparatus including a determining module, a processing module and a sending module. The determining module is configured to determine a transmission resource to be used and a complex-valued spreading sequence to be used. The processing module is configured to process a data symbol to be sent by using the complex-valued spreading sequence to generate a symbol sequence. The sending module is configured to send the symbol sequence through the transmission resource.

An embodiment of the present disclosure further provides a computer readable storage medium where computer executable instructions are stored, and when executed, the computer executable instructions can implement the data transmission method described above.

In the embodiments of the present disclosure, the data symbol to be sent is processed by using the determined complex-valued spreading sequence to obtain the symbol sequence, and the symbol sequence is sent through the determined transmission resource. Therefore, the interference among multiple users can be controlled efficiently, and the receiving detection complexity of the receiver can be controlled efficiently, and multi-user access communication performance can be improved efficiently, and simultaneous access communication of more user terminals can be supported.

In an exemplary embodiment, the system predetermines the association relationship between the transmission resources and the complex-valued spreading sequence sets, and the transmitter or terminal determines the complex-valued spreading sequence to be used from the associated complex-valued spreading sequence sets according to the determined transmission resources, or determines the transmission resource to be used from the associated transmission resources according to the complex-valued spreading sequence set in which the determined complex-valued spreading sequence is located. Thus, by controlling the complex-valued spreading sequence sets and the number of complex-valued spreading sequences therein used by the access users, the interference cancellation receiver can perform receiving detections on the access users on each transmission resource according to the associated complex-valued spreading sequence sets, thereby capable of decreasing the receiving detection complexity of the receiver. Meanwhile, the values of the real part and the imaginary part of each element of the used complex-valued spreading sequence are both from the M-element real number set, to be capable of ensuring efficiently that a plurality of transmitters or terminals using the same transmission resources can select the complex-valued spreading sequences with low cross-correlation to perform a spreading processing on their data symbols to be sent and then send, thereby controlling efficiently the interference among multiple users and supporting the larger number of access users. Further, the system can support simultaneous access communication of more user terminals in conjunction with divisions of the complex-valued spreading sequences and transmission resources.

After the accompanying drawings and detailed description are read and understood, other aspects can be understood.

BRIEF DESCRIPTION OF DRAWINGS

The accompanying drawings illustrated herein are intended to provide a further understanding of embodiments of the present disclosure and form a portion of the present disclosure. The embodiments of the present disclosure and the description thereof are intended to explain the present disclosure, and not limit the present disclosure inappropriately. In the accompanying drawings.

DETAILED DESCRIPTION

Embodiments of the present disclosure will be described in detail in conjunction with the accompanying drawings. It is should be noted that the embodiments in the present disclosure and features in the embodiments can be combined with each other arbitrarily without conflict.

Figure 1:
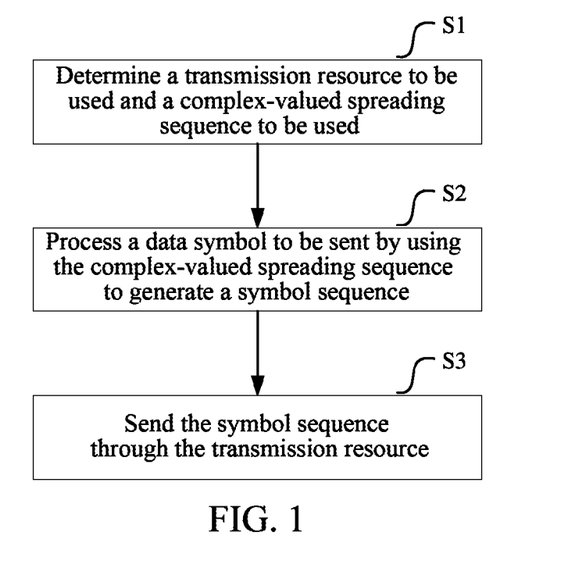
FIG. 1 is a flow chart of a data transmission method provided by an embodiment of the present disclosure.

FIG. 1 is a flow chart of a data transmission method provided by an embodiment of the present disclosure. As shown in FIG. 1, the data transmission method provided by the embodiment of the present disclosure can be applied to a transmitter or a terminal, and includes the following steps S1-S3:

In step S1, a transmission resource to be used and a complex-valued spreading sequence to be used are determined.

In an exemplary embodiment, in the step, that the transmission resource to be used and the complex-valued spreading sequence to be used are determined may include, but is not limited to, one of the following manners:

(1) determining the transmission resource to be used and the complex-valued spreading sequence to be used respectively;

(2) determining the transmission resource to be used firstly, and then determining the complex-valued spreading sequence to be used according to the transmission resource; and (3) determining the complex-valued spreading sequence to be used firstly, and then determining the transmission resource to be used according to the complex-valued spreading sequence.

In an exemplary embodiment, in the step, the transmission resource to be used is determined based on N transmission resources predetermined by a system, herein each transmission resource is a transmission resource unit, a transmission resource block or a transmission resource set, and N is an integer greater than or equal to 1.

In an exemplary embodiment, in the step, determining the transmission resource to be used may include, but is not limited to, one of the following manners:

(1) determining the transmission resource to be used according to a fixed configuration of a system;

(2) determining the transmission resource to be used according to indication signaling sent by the system; and (3) determining the transmission resource to be used according to identification information of a transmitter.

In an exemplary embodiment, in the step, determining the complex-valued spreading sequence to be used may include:

the complex-valued spreading sequence to be used is determined according to (but not limited to) at least one of the following manners:

(1) determining the complex-valued spreading sequence to be used according to a fixed configuration of a system;

(2) determining the complex-valued spreading sequence to be used according to indication signaling sent by the system;

(3) determining the complex-valued spreading sequence to be used according to identification information of a transmitter; and (4) determining the complex-valued spreading sequence to be used according to a random generation manner;

or, a complex-valued spreading sequence set in which the complex-valued spreading sequence to be used is located is firstly determined, and then the complex-valued spreading sequence to be used is determined from the complex-valued spreading sequence set.

Determining the complex-valued spreading sequence set in which the complex-valued spreading sequence to be used is located may include, but is not limited to, one of the following manners:

(1) determining the complex-valued spreading sequence set in which the complex-valued spreading sequence to be used is located according to the fixed configuration of the system;

(2) determining the complex-valued spreading sequence set in which the complex-valued spreading sequence to be used is located according to the indication signaling sent by the system; and (3) determining the complex-valued spreading sequence set in which the complex-valued spreading sequence to be used is located according to the identification information of the transmitter.

That the complex-valued spreading sequence to be used is determined from the complex-valued spreading sequence set may include, but is not limited to, one of the following manners:

(1) determining the complex-valued spreading sequence to be used from the complex-valued spreading sequence set according to the fixed configuration of the system;

(2) determining the complex-valued spreading sequence to be used from the complex-valued spreading sequence set according to the indication signaling sent by the system;

(3) determining the complex-valued spreading sequence to be used from the complex-valued spreading sequence set according to the identification information of the transmitter; and (4) determining the complex-valued spreading sequence to be used from the complex-valued spreading sequence set according to a random selection manner.

In an exemplary embodiment, in the step, the complex-valued spreading sequence to be used is determined based on S complex-valued spreading sequence sets predetermined by the system. Herein, each complex-valued spreading sequence set includes X complex-valued spreading sequences with a length of L, and S is an integer greater than or equal to 1, and X is an integer greater than or equal to 1, and L is an integer greater than 1.

In an exemplary embodiment, in the step, each element of the complex-valued spreading sequence is a complex number, and values of a real part and an imaginary part of each element are both from an M-element real number set. Herein, the M is an integer greater than or equal to 2.

In an exemplary embodiment, the M-element real number set includes, but is not limited to, one of:

a set formed by M integers within a range of [−(M−1)/2, (M−1)/2], herein the M is an odd number;

a set formed by M odd numbers within a range of [−(M−1), (M−1)], herein the M is an even number;

a set formed by M real numbers obtained through multiplying respectively M integers within a range of [−(M−1)/2, (M−1)/2] by a specified coefficient, herein the M is an odd number; and a set formed by M real numbers obtained through multiplying respectively M odd numbers within a range of [−(M−1), (M−1)] by a specified coefficient, herein the M is an even number.

Here, the specified coefficient may be used for implementing an energy normalization effect of the complex-valued spreading sequence.

In an exemplary embodiment, in the step, determining the complex-valued spreading sequence to be used according to the transmission resource includes:

determining the complex-valued spreading sequence to be used according to the transmission resource and the identification information of the transmitter based on a rule preset by the system or a random generation manner; or determining V complex-valued spreading sequence sets associated with transmission resources according to an association relationship, predetermined by the system, between the transmission resources and the complex-valued spreading sequence sets, and then selecting W complex-valued spreading sequences from the V complex-valued spreading sequence sets as complex-valued spreading sequences to be used.

W complex-valued spreading sequences are selected as complex-valued spreading sequences to be used from the V complex-valued spreading sequence sets according to (but not limited to) one of the following manners:

(1) the fixed configuration of the system;
(2) the indication signaling sent by the system;
(3) the identification information of the transmitter; and
(4) the random selection manner.

Herein, V is an integer greater than or equal to 1, and W is an integer greater than or equal to 1.

In an exemplary embodiment, in the step, determining the transmission resource to be used according to the complex-valued spreading sequence includes: determining Y transmission resources associated with complex-valued spreading sequence sets according to a complex-valued spreading sequence set in which the complex-valued spreading sequence is located and the association relationship, predetermined by the system, between the transmission resources and the complex-valued spreading sequence sets, and then selecting Z transmission resources from the Y transmission resources as the transmission resources to be used according to (but not limited to) one of the following manners:

(1) the fixed configuration of the system;
(2) the indication signaling sent by the system; and
(3) the identification information of the transmitter.

Herein, Y is an integer greater than or equal to 1, and Z is an integer greater than or equal to 1.

In an exemplary embodiment, the identification information of the transmitter includes, but is not limited to, one of:

(1) a serial number of the transmitter;
(2) an identification number of the transmitter;
(3) a position of the transmitter; and
(4) a network address of the transmitter.

In an exemplary embodiment, the association relationship, predetermined by the system, between the transmission resources and the complex-valued spreading sequence sets includes, but is not limited to, one of the following manners:

(1) a one-to-one corresponding relationship between one transmission resource and one complex-valued spreading sequence set;

(2) a corresponding relationship between one transmission resource and a plurality of complex-valued spreading sequence sets;

(3) a corresponding relationship between a plurality of transmission resources and one complex-valued spreading sequence set; and (4) a corresponding relationship between a plurality of transmission resources and a plurality of complex-valued spreading sequence sets.

In step S2, a data symbol to be sent is processed by using the complex-valued spreading sequence to generate a symbol sequence.

In an exemplary embodiment, in the step, a spreading processing is performed on the data symbol to be sent by using the complex-valued spreading sequence to generate a spread symbol sequence.

The spreading processing means that each data symbol to be sent is multiplied by each element (a complex number symbol) of the complex-valued spreading sequence to form finally a complex number symbol sequence with a length same as the length of the complex-valued spreading sequence.

In step S3, the symbol sequence is sent through the transmission resource.

In an exemplary embodiment, in the step, the symbol sequence is mapped to the transmission resource to form transmitting signals, and the transmitting signals are sent out.

Figure 2:
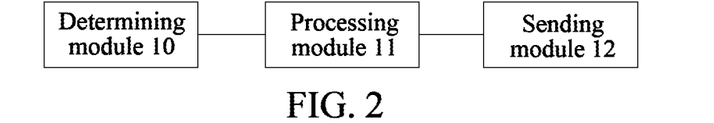
FIG. 2 is a block diagram of a data transmission apparatus provided by an embodiment of the present disclosure.

FIG. 2 is a block diagram of a data transmission apparatus provided by an embodiment of the present disclosure. As shown in FIG. 2, the data transmission apparatus provided by the embodiment of the present disclosure includes a determining module 10, a processing module 11 and a sending module 12. The determining module 10 is configured to determine a transmission resource to be used and a complex-valued spreading sequence to be used. The processing module 11 is configured to process a data symbol to be sent by using the complex-valued spreading sequence to generate a symbol sequence. The sending module 12 is configured to send the symbol sequence through the transmission resource.

The data transmission apparatus provided by the embodiment of the present disclosure is provided, for example, in a transmitter or a terminal. In addition, specific operations related to the apparatus are the same as those described in the above method and will not be repeated here.

The present disclosure will be described in detail in conjunction with specific embodiments.

The First Embodiment

Figure 3:
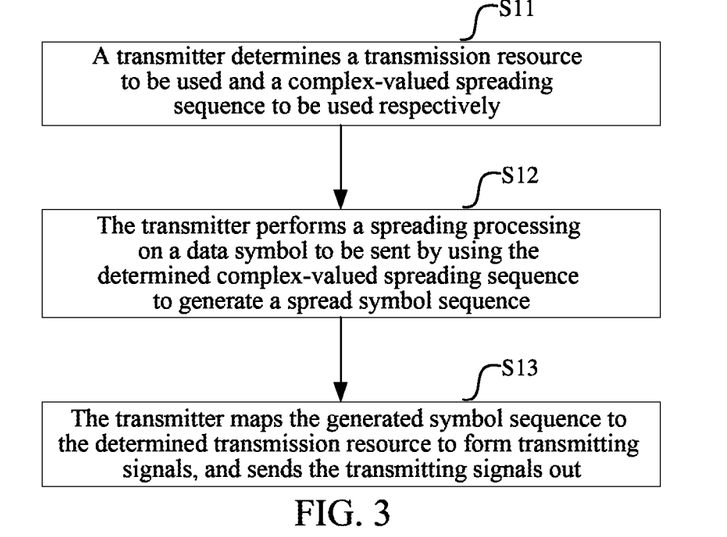
FIG. 3 is a flow chart of transmitting data by a transmitter in accordance with a first embodiment of the present disclosure.

As shown in FIG. 3, in the embodiment, the data transmission method includes the following steps S11-S13.

In step S11, a transmitter determines a transmission resource to be used and a complex-valued spreading sequence to be used respectively.

In this embodiment, the system predetermines N transmission resources, and each transmission resource is a transmission resource unit, a transmission resource block or a transmission resource set. Herein, N is an integer greater than or equal to 1.

The transmission resources described above may include various types or definitions of resources, such as carriers, time slots, time-frequency resources, space domain resources, etc.

That the transmitter determines a transmission resource to be used may include, but is not limited to, one of the following manners.

(1) Determining the transmission resource to be used according to a fixed configuration of a system. For example, the system configures fixedly the transmission resource that can be used by the transmitter, and the transmitter always uses the transmission resource for data transmission.

(2) Determining the transmission resource to be used according to indication signaling sent by the system. For example, when the transmitter is accessed to the system, the system sends the indication signaling to the transmitter to inform the transmitter of the transmission resource that can be used. Or, the system configures statically the transmission resource that can be used by the transmitter through a signaling, and the transmitter uses the transmission resource for data transmission during a relatively long time, and the system may change the transmission resource configured statically for the transmitter, but the time interval for the changes is longer, for example, a day, a week, a month, etc., or the transmission resource is changed when the system needs the changes. Or, the system sends semi-static indication signaling to the transmitter periodically or in a triggering manner to inform the transmitter of the transmission resource that can be used. Or, when the transmitter transmits data, the system sends dynamic indication signaling to the transmitter to inform the transmitter of the transmission resource that can be used.

(3) Determining the transmission resource to be used according to identification information of the transmitter. For example, the transmitter determines the transmission resource to be used according to a serial number, identification number, position or network address of the transmitter. For example, if serial numbers of multiple transmitters are 0, 1, . . . , A, respectively, and the number of the transmission resources is N, and indexes of the transmission resources are 0, 1, . . . , N−1, respectively, then the transmitter A can determine the transmission resource to be used as A mod N. Here, mod represents a complementation operation.

In the embodiment, the system predetermines S complex-valued spreading sequence sets, and each complex-valued spreading sequence set includes X complex-valued spreading sequences with a length of L. Herein, S is an integer greater than or equal to 1, and X is an integer greater than or equal to 1, and L is an integer greater than 1.

Each element of the above complex-valued spreading sequence is a complex number, and values of a real part and an imaginary part of each element are both from an M-element real number set. Herein, M is an integer greater than or equal to 2. For example, if the value of M is 2, then the values of the real part and the imaginary part of each element of the complex-valued spreading sequence are both from a set $\{-1, 1\}$; if the value of M is 3, then the values of the real part and the imaginary part of each element of the complex-valued spreading sequence are both from a set $\{-1, 0, 1\}$. In addition, an energy normalization processing on each of the complex-valued spreading sequence may further be considered.

That the transmitter determines the complex-valued spreading sequence to be used includes:

the transmitter determines the complex-valued spreading sequence to be used by (but not limited to) one of the following manners (1)-(4); or, the transmitter determines firstly a complex-valued spreading sequence set in which the complex-valued spreading sequence to be used is located, and then determines the complex-valued spreading sequence to be used from the complex-valued spreading sequence set.

The manners (1)-(4) by which the transmitter determines the complex-valued spreading sequence to be used are as follows.

(1) Determining the complex-valued spreading sequence to be used according to the fixed configuration of the system. For example, the system configures fixedly the complex-valued spreading sequence that can be used by the transmitter, and the transmitter always uses the complex-valued spreading sequence for data transmission.

(2) Determining the complex-valued spreading sequence to be used according to the indication signaling sent by the system. For example, when the transmitter is accessed to the system, the system sends the indication signaling to the transmitter to inform the transmitter of the complex-valued spreading sequence that can be used. Or, the system configures statically the complex-valued spreading sequence that can be used by the transmitter through a signaling, and the transmitter uses the complex-valued spreading sequence for data transmission during a relatively long time, and the system may change the complex-valued spreading sequence configured statically for the transmitter, but the time interval for the changes is longer, for example, a day, a week, a month, etc., or the complex-valued spreading sequence is changed when the system needs the changes. Or, the system sends semi-static indication signaling to the transmitter periodically or in a triggering manner to inform the transmitter of the complex-valued spreading sequence that can be used. Or, when the transmitter transmits data, the system sends dynamic indication signaling to the transmitter to inform the transmitter of the complex-valued spreading sequence that can be used.

(3) Determining the complex-valued spreading sequence to be used according to identification information of the transmitter. For example, the transmitter determines an initial state of a random sequence generator of the transmitter and generates randomly the complex-valued spreading sequence to be used according to the identification information of the transmitter based on a rule preset by the system. Or, the transmitter determines the complex-valued spreading sequence to be used according to a sequence mask or sequence index formed by the identification information of the transmitter.

(4) Determining the complex-valued spreading sequence to be used according to a random generation manner. For example, the transmitter generates the complex-valued spreading sequence to be used randomly by using the random sequence generator.

That the transmitter determines the complex-valued spreading sequence set in which the complex-valued spreading sequence to be used is located may include, but is not limited to, one of the following manners.

(1) Determining the complex-valued spreading sequence set in which the complex-valued spreading sequence to be used is located according to the fixed configuration of the system. For example, the system configures fixedly the complex-valued spreading sequence set that can be used by the transmitter, and the transmitter always determines the complex-valued spreading sequence to be used from the complex-valued spreading sequence set.

(2) Determining the complex-valued spreading sequence set in which the complex-valued spreading sequence to be used is located according to the indication signaling sent by the system. For example, when the transmitter is accessed to the system, the system sends the indication signaling to the transmitter to inform the transmitter of the complex-valued spreading sequence set that can be used. Or, the system configures statically the complex-valued spreading sequence set that can be used by the transmitter through a signaling, the transmitter determines the complex-valued spreading sequence to be used from the complex-valued spreading sequence set during a relatively long time, and the system can change the complex-valued spreading sequence set configured statically for the transmitter, but the time interval for the changes is longer, for example, a day, a week, a month, etc., or the complex-valued spreading sequence set is changed when the system needs the changes. Or, the system sends semi-static indication signaling to the transmitter periodically or in a triggering manner to inform the transmitter of the complex-valued spreading sequence set that can be used. Or, when the transmitter transmits data, the system sends dynamic indication signaling to the transmitter to inform the transmitter of the complex-valued spreading sequence set that can be used.

(3) Determining the complex-valued spreading sequence set in which the complex-valued spreading sequence to be used is located according to the identification information of the transmitter. For example, the transmitter determines the complex-valued spreading sequence set to be used according to a serial number, identification number, position or network address of the transmitter. For example, if serial numbers of a number of transmitters are 0, 1, . . . , A, respectively, the number of the complex-valued spreading sequence sets is S, and indexes of the complex-valued spreading sequence sets are 0, 1, . . . , S−1, respectively, then the transmitter A can determine the complex-valued spreading sequence set as A mod S, herein mod represents a complementation operation.

That the transmitter determines the complex-valued spreading sequence to be used from the determined complex-valued spreading sequence set may include, but is not limited to, one of the following manners.

(1) Determining the complex-valued spreading sequence to be used from the determined complex-valued spreading sequence set according to the fixed configuration of the system. For example, the system configures fixedly an index of the complex-valued spreading sequence that may be used by the transmitter, and the transmitter determines the complex-valued spreading sequence to be used from the determined complex-valued spreading sequence set according to the index.

(2) Determining the complex-valued spreading sequence to be used from the determined complex-valued spreading sequence set according to the indication signaling sent by the system. For example, when the transmitter is accessed to the system, the system sends the indication signaling to the transmitter to inform the transmitter of the index of the complex-valued spreading sequence that can be used. Or, the system configures statically the index of the complex-valued spreading sequence that can be used by the transmitter through a signaling, the transmitter determines the complex-valued spreading sequence to be used from the determined complex-valued spreading sequence set according to the index during a relatively long time, and the system may change the index of the complex-valued spreading sequence configured statically for the transmitter, but the time interval for the changes is longer, for example, a day, a week, a month, etc., or the index of the complex-valued spreading sequence is changed when the system needs the changes. Or, the system sends semi-static indication signaling to the transmitter periodically or in a triggering manner to inform the transmitter of the index of complex-valued spreading sequence that can be used. Or, when the transmitter transmits data, the system sends dynamic indication signaling to the transmitter to inform the transmitter of the index of the complex-valued spreading sequence that can be used.

(3) Determining the complex-valued spreading sequence to be used from the determined complex-valued spreading sequence set according to the identification information of the transmitter. For example, the transmitter determines the index of the complex-valued spreading sequence to be used according to a serial number, identification number, position or network address of the transmitter. For example, if serial numbers of a number of transmitters are 0, 1, . . . , A, respectively, and the number of the complex-valued spreading sequences in the determined complex-valued spreading sequence set is X, and the indexes of the complex-valued spreading sequences are 0, 1, . . . , X−1, respectively, then the transmitter A can determine the index of the complex-valued spreading sequence to be used as A mod X. Herein, mod represents a complementation operation.

(4) Determining the complex-valued spreading sequence to be used from the determined complex-valued spreading sequence set according to a random selection manner. For example, the transmitter uses a random number output from a random number generator of the transmitter as the index of the complex-valued spreading sequence, and determines the complex-valued spreading sequence to be used from the determined complex-valued spreading sequence set according to the index.

In step S12, the transmitter performs a spreading processing on the data symbol to be sent by using the determined complex-valued spreading sequence to generate a spread symbol sequence.

In addition, the transmitter may further perform a precoding processing or Fourier transform processing or the like on the above symbol sequence to generate the processed symbol sequence.

In step S13, the transmitter maps the generated symbol sequence to the determined transmission resource to form transmitting signals and sends the transmitting signals out.

The system described above is a data transmission transceiver system, including a transmitter, a receiver and a related functional node. The transmitter may be a terminal transmitter, a base station transmitter or another type of transmitter. The receiver may be a base station receiver, a terminal receiver or another type of receiver. The related functional node may be a network management unit, an operation and maintenance unit, etc. The description or operation related to the system may be implemented by a terminal, or a base station, or another type of transmitter or receiver, or a related functional node, which is not limited by embodiments of the present disclosure.

The Second Embodiment

Figure 4:
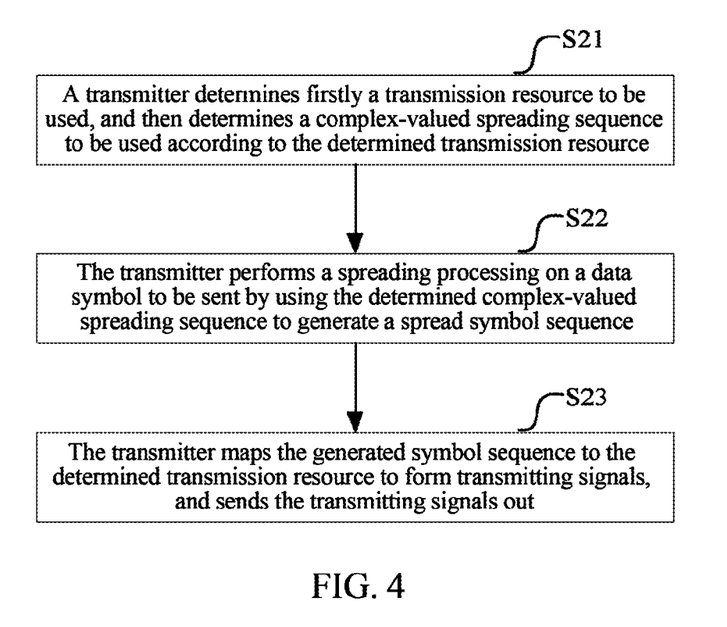
FIG. 4 is a flow chart of transmitting data by a transmitter in accordance with a second embodiment of the present disclosure.

As shown in FIG. 4, in the embodiment, the data transmission method includes the following steps S21-S23.

In step S21, a transmitter determines a transmission resource to be used firstly, and then determines a complex-valued spreading sequence to be used according to the determined transmission resource.

In the embodiment, the system predetermines N transmission resources. Herein, N is an integer greater than or equal to 1. The specific process is similar to the first embodiment, and will not be repeated.

The transmitter determines the transmission resource to be used, the specific process of which is similar to the first embodiment, and will not be repeated.

In the embodiment, the system further predetermines S complex-valued spreading sequence sets, and each complex-valued spreading sequence set includes X complex-valued spreading sequences with a length of L. Herein, S is an integer greater than or equal to 1, and X is an integer greater than or equal to 1, and L is an integer greater than 1. The specific process is similar to the first embodiment, and will not be repeated.

In the embodiment, the association relationship, further predetermined by the system, between the transmission resources and the complex-valued spreading sequence sets may include, but is not limited to, one of the following manners:

(1) a one-to-one corresponding relationship between one transmission resource and one complex-valued spreading sequence set;

(2) a corresponding relationship between one transmission resource and a plurality of complex-valued spreading sequence sets;

(3) a corresponding relationship between a plurality of transmission resources and one complex-valued spreading sequence set; and (4) a corresponding relationship between a plurality of transmission resources and a plurality of complex-valued spreading sequence sets. In this mode, the plurality of transmission resources may form one combination of the transmission resources, and the plurality of complex-valued spreading sequence sets may form one combination of the complex-valued spreading sequence sets. There may be a one-to-one corresponding relationship or other corresponding relationships between the plurality of transmission resources and the plurality of complex-valued spreading sequence sets. For example, there is a one-to-one corresponding relationship between the combination of the transmission resources and the combination of the complex-valued spreading sequence sets as a whole. When determining the transmission resource to be used, the transmitter can determine that it will use all the transmission resources among the plurality of transmission resources.

Here, the system predetermines the association relationship between the transmission resources and the complex-valued spreading sequence sets, which may be configured fixed by the system, or configured by the system through signaling, or indicated implicitly by the system.

That the transmitter determines the complex-valued spreading sequence to be used according to the determined transmission resource includes:

determining the complex-valued spreading sequence to be used according to the determined transmission resource and the identification information of the transmitter based on a rule preset by the system or a random generation manner; for example, the transmitter determines an initial state of a random sequence generator of the transmitter according to the determined index of the transmission resource based on the a rule preset by the system, and determines a sequence mask or sequence index according to identification information of the transmitter, and generates randomly the complex-valued spreading sequence to be used; or the transmitter determines the initial state of the random sequence generator of the transmitter according to the determined index of the transmission resource and identification information of the transmitter based on the a rule preset by the system, and generates randomly the complex-valued spreading sequence to be used;

or, determining V complex-valued spreading sequence sets associated with determined transmission resources according to the association relationship, predetermined by the system, between the transmission resources and the complex-valued spreading sequence sets, and then determining the complex-valued spreading sequence to be used by (but not limited to) one of the following manners (1)-(4).

Herein, the manners (1)-(4) above mentioned are as follows.

(1) W complex-valued spreading sequences are selected from the V complex-valued spreading sequence sets as complex-valued spreading sequences to be used according to the fixed configuration of the system. For example, the system configures fixedly indexes of the complex-valued spreading sequences that can be used by the transmitter, or the complex-valued spreading sequence sets and indexes of the complex-valued spreading sequences that can be used by the transmitter, and the transmitter determines the W complex-valued spreading sequences to be used from the determined V complex-valued spreading sequence sets according to the information.

(2) W complex-valued spreading sequences are selected from the V complex-valued spreading sequence sets as the complex-valued spreading sequences to be used according to the indication signaling sent by the system. For example, when the transmitter is accessed to the system, the system sends the indication signaling to the transmitter to inform the transmitter of indexes of the complex-valued spreading sequences or indexes of the complex-valued spreading sequence sets and the complex-valued spreading sequences, that can be used by the transmitter. Or, the system configures statically the indexes of the complex-valued spreading sequences, or the indexes of the complex-valued spreading sequence sets and the complex-valued spreading sequences, that can be used by the transmitter, through a signaling, the transmitter determines the W complex-valued spreading sequences to be used from the determined V complex-valued spreading sequence sets according to this information during a relatively long time, and the system may change the information configured statically for the transmitter, but the time interval for the changes is longer, for example, a day, a week, a month, etc., or the information is changed when the system needs the changes. Or, the system sends semi-static indication signaling to the transmitter periodically or in a triggering manner to inform the transmitter of the indexes of the complex-valued spreading sequences, or the complex-valued spreading sequence sets and the indexes of complex-valued spreading sequences, that can be used by the transmitter. Or, when the transmitter transmits data, the system sends dynamic indication signaling to the transmitter to inform the transmitter of the indexes of the complex-valued spreading sequences, or the complex-valued spreading sequence sets and the indexes of complex-valued spreading sequences, that can be used by the transmitter.

(3) W complex-valued spreading sequences are selected from the V complex-valued spreading sequence sets as the complex-valued spreading sequences to be used according to the identification information of the transmitter. For example, the transmitter determines the indexes of the complex-valued spreading sequences or the complex-valued spreading sequence sets and the indexes of the complex-valued spreading sequences, that will be used, according to a serial number, identification number, position or network address of the transmitter. For example, if serial numbers of a number of transmitters are 0, 1, . . . , A, respectively, and the numbers of the complex-valued spreading sequences in the determined V complex-valued spreading sequence sets are all X, and the indexes of the complex-valued spreading sequences are 0, 1, . . . , X−1, respectively, then the transmitter A can determine the indexes of the complex-valued spreading sequences to be used as A mod X, herein mod represents a complementation operation.

(4) W complex-valued spreading sequences are selected from the V complex-valued spreading sequence sets as the complex-valued spreading sequences to be used according to a random selection manner. For example, the transmitter uses random numbers output from a random number generator of the transmitter as the indexes of the complex-valued spreading sequences, or the indexes of the complex-valued spreading sequence sets and the complex-valued spreading sequences, and determines the W complex-valued spreading sequences to be used from the determined V complex-valued spreading sequence sets according to this information.

Herein, V is an integer greater than or equal to 1, and W is an integer greater than or equal to 1.

Selecting the W complex-valued spreading sequences from the V complex-valued spreading sequence sets may include, but is not limited to, one of the following manners.

(1) If the number of the transmission resources determined by the transmitter is one, and there is a one-to-one corresponding relationship between the transmission resources and the complex-valued spreading sequence sets, then the transmitter determines that the number of the complex-valued spreading sequence sets associated with the determined transmission resource is also one, and the transmitter can select one complex-valued spreading sequence or a plurality of complex-valued spreading sequences from the complex-valued spreading sequence set as the complex-valued spreading sequence(s) to be used.

(2) If the number of the transmission resources determined by the transmitter is multiple, and there is a one-to-one corresponding relationship between the transmission resources and the complex-valued spreading sequence sets, then the transmitter determines that the number of the complex-valued spreading sequence sets associated with the determined transmission resources is also multiple. Therefore, the transmitter can select one complex-valued spreading sequence from one of the complex-valued spreading sequence sets as the complex-valued spreading sequence to be used. Or, the transmitter can select one complex-valued spreading sequence from these complex-valued spreading sequence sets respectively as the complex-valued spreading sequences to be used. Or, the transmitter can select a plurality of complex-valued spreading sequences from one of the complex-valued spreading sequence sets as the complex-valued spreading sequences to be used.

(3) If the number of the transmission resources determined by the transmitter is one, and one transmission resource corresponds to a plurality of complex-valued spreading sequence sets, then the transmitter determines that the number of the complex-valued spreading sequence sets associated with the determined transmission resource is multiple. Therefore, the transmitter can select one complex-valued spreading sequence from one of the complex-valued spreading sequence sets as the complex-valued spreading sequence to be used. Or, the transmitter can select a plurality of complex-valued spreading sequences from one of the complex-valued spreading sequence sets as the complex-valued spreading sequences to be used. Or, the transmitter can select one complex-valued spreading sequence from these complex-valued spreading sequence sets respectively as the complex-valued spreading sequences to be used.

(4) If the number of the transmission resources determined by the transmitter is multiple, and these transmission resources correspond to one complex-valued spreading sequence set, then the transmitter determines that the number of the complex-valued spreading sequence sets associated with the determined transmission resources is one. Therefore, the transmitter can select one or more complex-valued spreading sequences from the complex-valued spreading sequence set as the complex-valued spreading sequence(s) to be used.

(5) If the number of the transmission resources determined by the transmitter is multiple, and these transmission resources correspond to a plurality of complex-valued spreading sequence sets, then the transmitter determines that the number of the complex-valued spreading sequence sets associated with the determined transmission resources is multiple. Therefore, the transmitter can select one complex-valued spreading sequence from one of the complex-valued spreading sequence sets as the complex-valued spreading sequence to be used, or the transmitter can select a plurality of complex-valued spreading sequences from one of the complex-valued spreading sequence sets as the complex-valued spreading sequences to be used, or the transmitter can select one complex-valued spreading sequence from these complex-valued spreading sequence sets respectively as the complex-valued spreading sequences to be used.

In step S22, the transmitter performs a spreading processing on the data symbol to be sent by using the determined complex-valued spreading sequence to generate a spread symbol sequence.

In step S23, the transmitter maps the generated symbol sequence to the determined transmission resource to form transmitting signals, and sends the transmitting signals out.

The Third Embodiment

Figure 5:
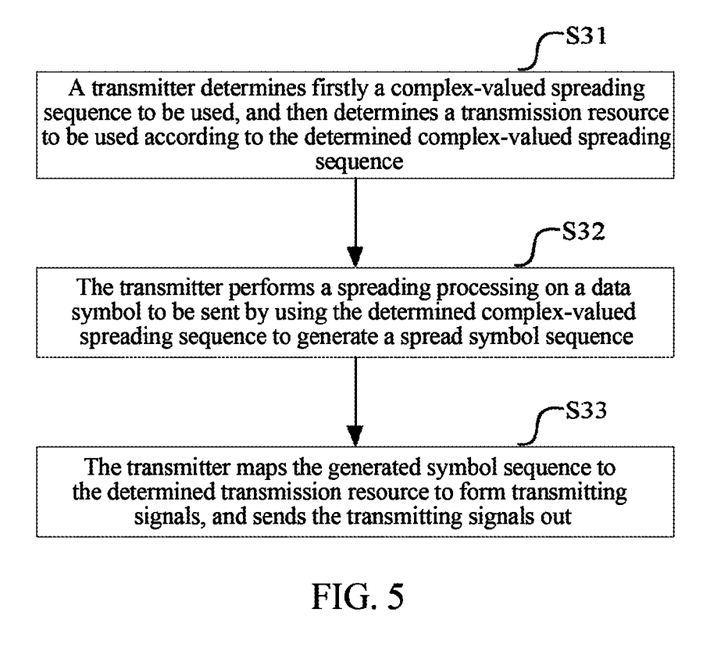
FIG. 5 is a flow chart of transmitting data by a transmitter in accordance with a third embodiment of the present disclosure.

As shown in FIG. 5, in the embodiment, the data transmission method includes the following steps S31-S33.

In step S31, a transmitter determines firstly the complex-valued spreading sequence to be used, and then determines the transmission resource to be used according to the determined complex-valued spreading sequence.

In the embodiment, the system predetermines S complex-valued spreading sequence sets, and each complex-valued spreading sequence set includes X complex-valued spreading sequences with a length of L. Herein, S is an integer greater than or equal to 1, and X is an integer greater than or equal to 1, and L is an integer greater than 1. The specific process is similar to the first embodiment, and will not be repeated.

That the transmitter determines complex-valued spreading sequence to be used includes: the transmitter determines the complex-valued spreading sequence to be used according to a fixed configuration of a system, indication signaling sent by the system, identification information of the transmitter or a random generation manner; or the transmitter firstly determines a complex-valued spreading sequence set in which the complex-valued spreading sequence to be used is located, and then determines the complex-valued spreading sequence to be used from the complex-valued spreading sequence set. The specific process is similar to the first embodiment, and will not be repeated.

In the embodiment, the system further predetermines N transmission resources. Herein, N is an integer greater than or equal to 1. The specific process is similar to the first embodiment, and will not be repeated.

The system further predetermines the association relationship between the transmission resources and the complex-valued spreading sequence sets, the specific process of which is similar to the second embodiment, and will not be repeated.

That the transmitter determines the transmission resource to be used according to the determined complex-valued spreading sequence includes: determining Y transmission resources associated with the determined complex-valued spreading sequence sets according to the complex-valued spreading sequence set in which the determined complex-valued spreading sequence is located and the association relationship, predetermined by the system, between the transmission resources and the complex-valued spreading sequence sets, and then determining the transmission resources to be used by (but not limited to) one of the following manners.

(1) Z transmission resources are selected from the Y transmission resources as the transmission resources to be used according to the fixed configuration of the system. For example, the system configures fixedly indexes of the transmission resources that can be used by the transmitter, and the transmitter determines the Z transmission resources from the determined Y transmission resources according to this information.

(2) Z transmission resources are selected from the Y transmission resources as the transmission resources to be used according to the indication signaling sent by the system. For example, when the transmitter is accessed to the system, the system sends the indication signaling to the transmitter to inform the transmitter of indexes of the transmission resources that can be used by the transmitter. Or, the system configures statically the indexes of the transmission resources that can be used by the transmitter through a signaling, the transmitter determines the Z transmission resources from the determined Y transmission resources according to this information during a relatively long time, and the system may change the information configured statically for the transmitter, but the time interval for the changes is longer, for example, a day, a week, a month, etc., or the information is changed when the system needs the changes. Or, the system sends semi-static indication signaling to the transmitter periodically or in a triggering manner to inform the transmitter of the indexes of the transmission resources that can be used by the transmitter. Or, when the transmitter transmits data, the system sends dynamic indication signaling to the transmitter to inform the transmitter of the indexes of the transmission resources that can be used by the transmitter.

(3) Z transmission resources are selected from the Y transmission resources as the transmission resources to be used according to the identification information of the transmitter. For example, the transmitter determines the indexes of the transmission resources to be used according to a serial number, identification number, position or network address of the transmitter. For example, if serial numbers of a number of transmitters are 0, 1, . . . , A, respectively, and the number of the transmission resources is Y, and the indexes of the transmission resources are 0, 1, . . . , Y−1, respectively, then the transmitter A can determine the transmission resources to be used as A mod Y. Herein, mod represents a complementation operation.

Herein, Y is an integer greater than or equal to 1, and Z is an integer greater than or equal to 1.

Selecting the Z transmission resources from the Y transmission resources may include, but is not limited to, one of the following manners.

(1) If the number of the complex-valued spreading sequence sets determined by the transmitter is one, and there is a one-to-one corresponding relationship between the transmission resources and the complex-valued spreading sequence sets, then the transmitter determines that the number of the transmission resources associated with the determined complex-valued spreading sequence set is also one, and the transmitter can select this transmission resource as the transmission resource to be used.

(2) If the number of the complex-valued spreading sequence sets determined by the transmitter is multiple, and there is a one-to-one corresponding relationship between the transmission resources and the complex-valued spreading sequence sets, then the transmitter determines that the number of the transmission resources associated with the determined complex-valued spreading sequence sets is also multiple, and the transmitter can select one, multiple or all of the transmission resources from these transmission resources as the transmission resources to be used.

(3) If the number of the complex-valued spreading sequence sets determined by the transmitter is one, and the complex-valued spreading sequence set corresponds to a plurality of transmission resources, then the transmitter determines that the number of the transmission resources associated with the determined complex-valued spreading sequence set is multiple, and the transmitter can select one, multiple or all of the transmission resources as the transmission resources to be used.

(4) If the number of the complex-valued spreading sequence sets determined by the transmitter is multiple, and these complex-valued spreading sequence sets correspond to one transmission resource, then the transmitter determines that the number of the transmission resources associated with the determined complex-valued spreading sequence sets is one, and the transmitter can select this transmission resource as the transmission resource to be used.

(5) If the number of the complex-valued spreading sequence sets determined by the transmitter is multiple, and these complex-valued spreading sequence sets correspond to a plurality of transmission resources, then the transmitter determines that the number of the transmission resources associated with the determined complex-valued spreading sequence sets is multiple, and the transmitter can select one, multiple or all of the transmission resources as the transmission resources to be used.

In step S32, the transmitter performs a spreading processing on a data symbol to be sent by using the determined complex-valued spreading sequence to generate a spread symbol sequence.

In step S33, the transmitter maps the generated symbol sequence to the determined transmission resources to form transmitting signals, and sends the transmitting signals out.

The Fourth Embodiment

In the embodiment, K transmitters determine the transmission resources to be used and the complex-valued spreading sequences to be used respectively. Herein, each of the transmitters determining the transmission resource to be used and the complex-valued spreading sequence to be used may include, but is not limited to, one of the following manners.

(1) Determining the transmission resource to be used and the complex-valued spreading sequence to be used respectively. The specific process is similar to the first embodiment, and will not be repeated.

(2) Determining firstly the transmission resource to be used, and then determining the complex-valued spreading sequence to be used according to the transmission resource. The specific process is similar to the second embodiment, and will not be repeated.

(3) Determining firstly the complex-valued spreading sequence to be used, and then determining the transmission resource to be used according to the complex-valued spreading sequence. The specific process is similar to the third embodiment, and will not be repeated.

Moreover, the system predetermines N transmission resources, herein N is an integer greater than or equal to 1. The specific process is similar to the first embodiment, and will not be repeated.

The system further predetermines S complex-valued spreading sequence sets. Each complex-valued spreading sequence set includes X complex-valued spreading sequences with a length of L. Herein, S is an integer greater than or equal to 1, and X is an integer greater than or equal to 1, and L is an integer greater than 1. The specific process is similar to the first embodiment, and will not be repeated.

The system further predetermines the association relationship between the transmission resources and the complex-valued spreading sequence sets. The specific process is similar to the second embodiment, and will not be repeated.

Figure 6:
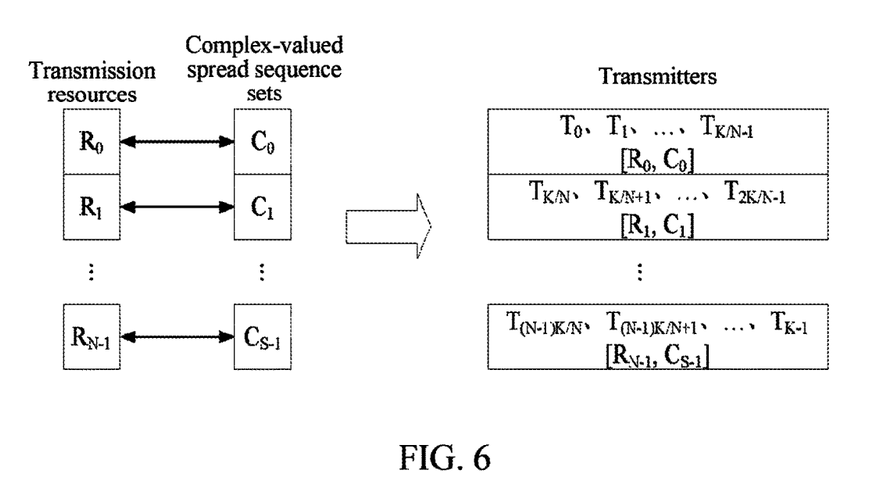
FIG. 6 is a schematic diagram in which K transmitters determine transmission resources and complex-valued spreading sequences in accordance with a fourth embodiment of the present disclosure.

As shown in FIG. 6, as a situation in the embodiment, assuming that the N transmission resources are denoted as $[R_0, R_1, \ldots, R_{N-1}]$ respectively, and the S complex-valued spreading sequence sets are denoted as $[C_0, C_1, \ldots, C_{S-1}]$, and the number of the transmission resources is the same as the number of the complex-valued spreading sequence sets, i.e., N=S, and there is a one-to-one corresponding relationship between the transmission resources and the complex-valued spreading sequence sets. And assuming that the K transmitters are denoted as $[T_0, T_1, \ldots, T_{K-1}]$ respectively, herein the transmitters $T_0, T_1, \ldots, T_{K/N-1}$ determine that the transmission resource to be used is $R_0$ and the complex-valued spreading sequence set in which the complex-valued spreading sequence to be used is located is $C_0$, and the transmitters $T_{K/N}, T_{K/N+1}, \ldots, T_{2K/N-1}$ determine that the transmission resource to be used is $R_1$ and the complex-valued spreading sequence set in which the complex-valued spreading sequence to be used is located is $C_1$, and likewise, the transmitters $T_{(N-1)K/N}, T_{(N-1)K/N+1}, \ldots, T_{K-1}$ determine that the transmission resource to be used is $R_{N-1}$ and the complex-valued spreading sequence set in which the complex-valued spreading sequence to be used is located is $C_{S-1}$. Each of the transmitters determines the complex-valued spreading sequence to be used from the determined complex-valued spreading sequence set respectively.

Figure 7:
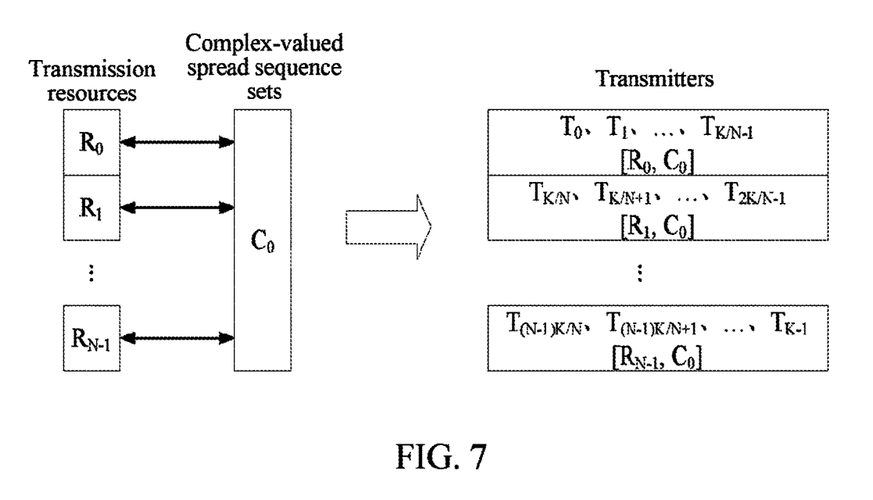
FIG. 7 is another schematic diagram in which K transmitters determine transmission resources and complex-valued spreading sequences in accordance with a fourth embodiment of the present disclosure.

As shown in FIG. 7, as another situation in the embodiment, assuming that the N transmission resources are denoted as $[R_0, R_1, \ldots, R_{N-1}]$ respectively, and the S complex-valued spreading sequence sets are denoted as $[C_0]$, i.e., the number of the complex-valued spreading sequence sets is one, and the N transmission resources correspond to one complex-valued spreading sequence set. And assuming that the K transmitters are denoted as $[T_0, T_1, \ldots, T_{K-1}]$ respectively. Herein, the transmitters $T_0, T_1, \ldots, T_{X/N-1}$ determine that the transmission resource to be used is $R_0$ and the complex-valued spreading sequence set in which the complex-valued spreading sequence to be used is located is $C_0$, and the transmitters $T_{K/N}, T_{K/N+1}, \ldots, T_{2K/N-1}$ determine that the transmission resource to be used is $R_1$ and the complex-valued spreading sequence set in which the complex-valued spreading sequence to be used is located is $C_0$, and likewise, the transmitters $T_{(N-1)K/N}, T_{(N-1)K/N+1}, T_{K-1}$ determine that the transmission resource to be used is $R_{N-1}$ and the complex-valued spreading sequence set in which the complex-valued spreading sequence to be used is located is $C_0$. Each of the transmitters determines the complex-valued spreading sequence to be used from the determined complex-valued spreading sequence set respectively.

Figure 8:
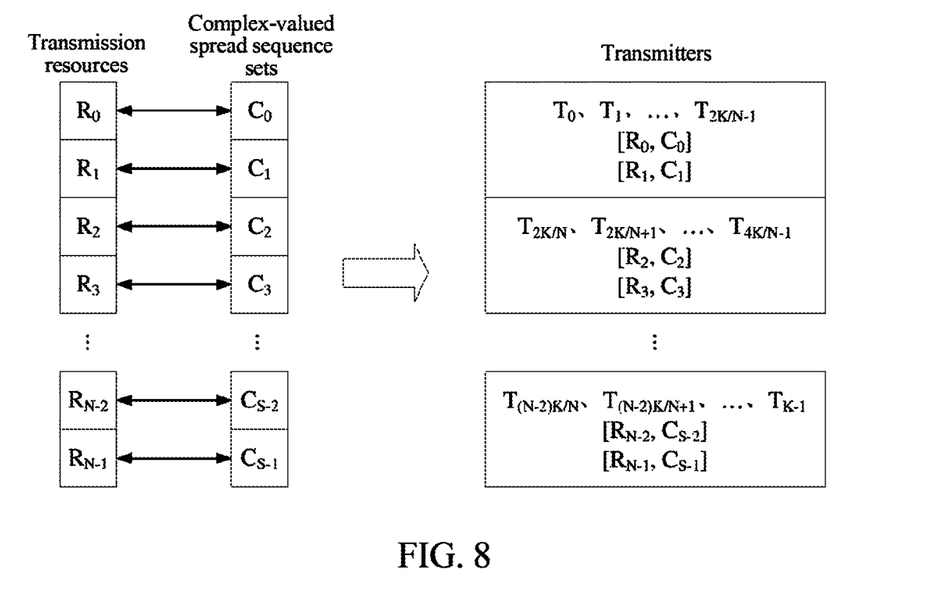
FIG. 8 is a further schematic diagram in which K transmitter determine transmission resources and complex-valued spreading sequences in accordance with a fourth embodiment of the present disclosure.

As shown in FIG. 8, as a further situation in the embodiment, assuming that the N transmission resources are denoted as $[R_0, R_1, \ldots, R_{N-1}]$ respectively, and the S complex-valued spreading sequence sets are denoted as $[C_0, C_1, \ldots, C_{S-1}]$, and the number of the transmission resources is the same as the number of the complex-valued spreading sequence sets, i.e., N=S, and there is a one-to-one corresponding relationship between the transmission resources and the complex-valued spreading sequence sets. And assuming that the K transmitters are denoted as $[T_0, T_1, \ldots, T_{K-1}]$ respectively. Herein, the transmitters $T_0, T_1, \ldots, T_{2K/N-1}$ determine that the transmission resources to be used are $R_0$ and $R_1$ and the complex-valued spreading sequence sets in which the complex-valued spreading sequences to be used are located are $C_0$ and $C_1$, and the transmitters $T_{2K/N}, T_{2K/N+1}, \ldots, T_{4K/N-1}$ determine that the transmission resources to be used is $R_2$ and $R_3$ and the complex-valued spreading sequence sets in which the complex-valued spreading sequences to be used are located are $C_2$ and $C_3$, and likewise, the transmitters $T_{(N-2)K/N}, T_{(N-2)K/N+1}, \ldots, T_{K-1}$ determine that the transmission resources to be used are $R_{N-2}$ and $R_{N-1}$ and the complex-valued spreading sequence sets in which the complex-valued spreading sequences to be used are located are $C_{S-2}$ and $C_{S-1}$. Each of the transmitters determines the complex-valued spreading sequences to be used from the determined complex-valued spreading sequence sets respectively, and each of the transmitters determines the complex-valued spreading sequences to be used from the two determined complex-valued spreading sequence sets respectively, and applies them to the two determined transmission resources.

Figure 9:
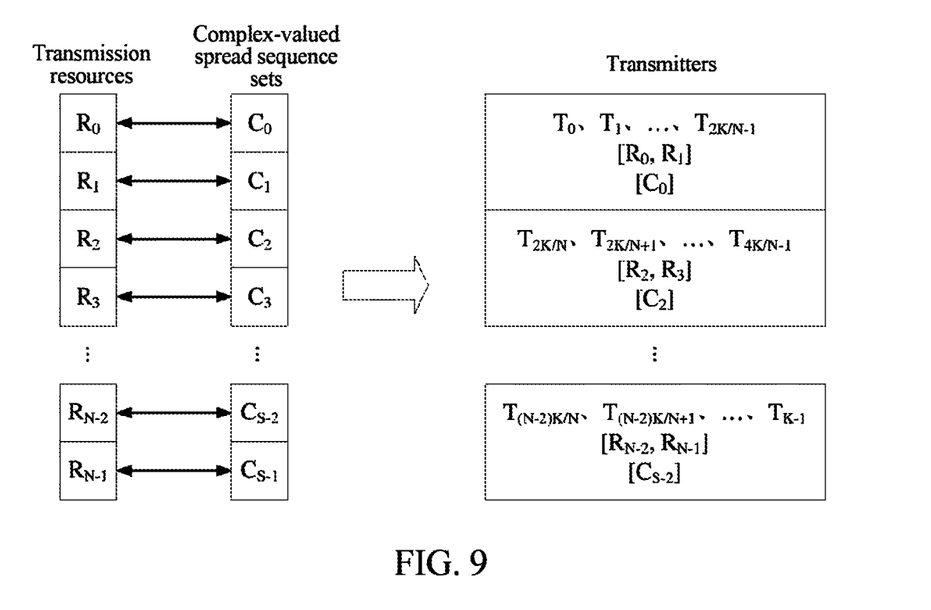
FIG. 9 is a still further schematic diagram in which K transmitters determine transmission resources and complex-valued spreading sequences in accordance with a fourth embodiment of the present disclosure.

As shown in FIG. 9, as a still further situation in the embodiment, assuming that the N transmission resources are denoted as $[R_0, R_1, \ldots, R_{N-1}]$ respectively, and the S complex-valued spreading sequence sets are denoted as $[C_0, C_1, \ldots, C_{S-1}]$, and the number of the transmission resources is the same as the number of the complex-valued spreading sequence sets, i.e., N=S, and there is a one-to-one corresponding relationship between the transmission resources and the complex-valued spreading sequence sets. And assuming that the K transmitters are denoted as $[T_0, T_1, \ldots, T_{K-1}]$ respectively. Herein, the transmitters $T_0, T_1, \ldots, T_{2K/N-1}$ determine that the transmission resources to be used are $R_0$ and $R_1$ and determine that the complex-valued spreading sequence set in which the complex-valued spreading sequence to be used is located is $C_0$ according to the transmission resource $R_0$, and the transmitters $T_{2K/N}, T_{2K/N+1}, \ldots, T_{4K/N-1}$ determine that the transmission resources to be used is $R_2$ and $R_3$ and determine that the complex-valued spreading sequence set in which the complex-valued spreading sequence to be used is located is $C_2$ according to the transmission resource $R_2$, and likewise, the transmitters $T_{(N-2)K/N}, T_{(N-2)K/N+1}, \ldots, T_{K-1}$ determine that the transmission resources to be used are $R_{N-2}$ and $R_{N-1}$ and determine that the complex-valued spreading sequence set in which the complex-valued spreading sequence to be used is located is $C_{S-2}$ according to the transmission resource $R_{N-2}$. Each of the transmitters determines the complex-valued spreading sequence to be used from the determined complex-valued spreading sequence set respectively, and each of the transmitters determines the complex-valued spreading sequence to be used from the one determined complex-valued spreading sequence set, and applies it to the two determined transmission resources.

In addition, there are many other situations in the embodiment, which can be processed with reference to the situations described above and will not be repeated.

In the embodiment, the K transmitters perform spreading processing on their respective data symbols to be sent by using the determined complex-valued spreading sequences to generate the spread symbol sequences.

In the embodiment, the K transmitters map the generated symbol sequences to the determined transmission resources to form transmitting signals and send the transmitting signals out.

When the receiver performs a receiving detection, since a plurality of transmitters transmit data on the same transmission resources, the receiver may use the interference cancellation signal detection method (such as successive interference cancellation (SIC)), and detects which transmitters are transmitting the data on each transmission resource and the data sent by the transmitters which are transmitting the data according to the complex-valued spreading sequence that are used by these transmitters and the complex-valued spreading sequence sets in which the complex-valued spreading sequence is located. Thus, by controlling the complex-valued spreading sequence sets and the number of the complex-valued spreading sequences therein used by each of the transmitters, the receiving detection complexity of the receiver may be decreased. Meanwhile, the values of the real part and the imaginary part of each element of the used complex-valued spreading sequence are both from the M-element real number set, which can ensure efficiently that a plurality of transmitters using the same transmission resources select the complex-valued spreading sequences with low cross-correlation to perform spreading processing on their data symbols to be sent and then send, thereby controlling efficiently the interference among multiple users and supporting the higher number of access users. Further, the system can support simultaneous access communication of more user terminals in conjunction with divisions of the complex-valued spreading sequence and transmission resources. Therefore, the embodiment can control efficiently the interference among multiple users and control efficiently the receiving detection complexity of the receiver, and thereby can improve efficiently multi-user access communication performance and support simultaneous access communication of more user terminals.

The embodiments described above may be applied to uplink data transmission, or may also be applied to downlink data transmission. At the point if necessary, the transmitter needs to send information about the determined transmission resources to be used and/or information about the determined complex-valued spreading sequence to be used to the receiver for the receiving detection of the receiver.

The embodiments described above may be applied to, in specific applications, MC-CDMA systems, contention access scenarios, or scheduling-free access or grant-free access or access without grant scenarios.

For the MC-CDMA systems, according to the above embodiments, the transmitter processes data to be sent by using the determined complex-valued spreading sequence and transmits the data on the determined transmission resources, and a plurality of transmitters can transmit the data on the same time-frequency resources. The receiver can distinguish efficiently the data sent by the plurality of transmitters, which send the data on the same transmission resources, by using an interference cancellation detector (e.g. SIC). The above embodiments applied to the MC-CDMA systems can control efficiently the interference among multiple users, and support simultaneous data transmission of a large number of terminals, and control efficiently the receiving detection complexity of the receiver, and thereby can improve efficiently multi-user access communication performance.

For the contention access scenarios, according to the above embodiments, the terminals request to access the system on the determined transmission resources according to the determined complex-valued spreading sequence. A number of, or even a large number of terminals can request simultaneously to access the system on the same transmission resources. The receiver can distinguish efficiently signals transmitted by different access terminals on the same transmission resources by using an interference cancellation detector, thereby supporting contention access of a large number of terminals, improving efficiently the access efficiency of the system and improving the access experience of the terminals.

For the scheduling-free access or grant-free access or access without grant scenarios, according to the above embodiments, when the terminals need to send data, the terminals process data to be sent by using the determined complex-valued spreading sequence and transmit the data on the determined transmission resources. A number of terminals can transmit the data simultaneously on the same transmission resources. The receiver can distinguish efficiently signals transmitted by various terminals, which transmit data on the same transmission resources, by using an interference cancellation detector, thereby supporting simultaneous data transmission of a large number of terminals, improving experience of scheduling-free or grant-free communication of the terminals, further reducing scheduling/grant signaling of the system and decreasing transmission delay of the terminals.

Additionally, an embodiment of the present disclosure further provides a computer readable storage medium where computer executable instructions are stored, and when executed, the computer executable instructions can implement the data transmission method described above.

The ordinary skilled in the art can understand that all or part of steps in the methods described above may be carried out by the related hardware (such as processor) through programs, and the programs may be stored in a computer readable storage medium, such as a read only memory, a magnetic disk or an optical disk or the like. Optionally, all or part of steps in the embodiments described above may also be carried out by using one or more integrated circuits. Accordingly, various modules/units in the embodiments may be implemented in the form of hardware, for example, using an integrated circuit to implementation their corresponding functions, or may be implemented in the form of a software function module, for example, executing programs/instructions stored in a memory through a processor to implement their corresponding functions. The present disclosure is not limited to the combination of any specific form of hardware and software.

Basic principles, main features and advantages of the present disclosure are illustrated and described above. The present disclosure is not limited by the above embodiments. What described in the above embodiments and the description only illustrates the principles of the present disclosure. Various variations and improvements of the present disclosure can be made without departing from the rule and scope of the present disclosure. The variations and improvements will all fall into the protection scope claimed by the present disclosure.

INDUSTRIAL APPLICABILITY

The embodiments of the present disclosure provide a data transmission method and apparatus, which can control efficiently the interference among multiple users, control efficiently the receiving detection complexity of the receiver, improve efficiently multi-user access communication performance, and support simultaneous access communication of more user terminals.

What we claim is:

1. A data transmission method, comprising the following steps:
   determining a transmission resource to be used and a complex-valued spreading sequence to be used;
   processing a data symbol to be sent by using the complex-valued spreading sequence to generate a symbol sequence; and
   sending the symbol sequence through the transmission resource,
   wherein each element of the complex-valued spreading sequence is a complex number, and values of a real part and an imaginary part of each element are both from an M-element real number set, wherein the M is an integer greater than or equal to 2, and the M-element real number set is selected from:
   a set formed by M integers within a range of $[-(M-1)/2, (M-1)/2]$, wherein the M is an odd number;
   a set formed by M odd numbers within a range of $[-(M-1), (M-1)]$, wherein the M is an even number;
   a set formed by M real numbers obtained through multiplying respectively M integers within a range of $[-(M-1)/2, (M-1)/2]$ by specified coefficient(s), wherein the M is an odd number; and
   a set formed by M real numbers obtained through multiplying respectively M odd numbers within a range of $[-(M-1), (M-1)]$ by specified coefficient(s), wherein the M is an even number.

2. The data transmission method according to claim 1, wherein the determining a transmission resource to be used and a complex-valued spreading sequence to be used comprises one of the following manners:
   determining the transmission resource to be used and the complex-valued spreading sequence to be used respectively;
   determining the transmission resource to be used firstly, and then determining the complex-valued spreading sequence to be used according to the transmission resource; and
   determining the complex-valued spreading sequence to be used firstly, and then determining the transmission resource to be used according to the complex-valued spreading sequence.

3. The data transmission method according to claim 2, wherein the determining the transmission resource to be used comprises: determining the transmission resource to be used according to a fixed configuration of a system, indication signaling sent by the system, or identification information of a transmitter.

4. The data transmission method according to claim 3, wherein the identification information of the transmitter at least comprises one of: a serial number of the transmitter, an identification number of the transmitter, a position of the transmitter and a network address of the transmitter.

5. The data transmission method according to claim 2, wherein the determining the complex-valued spreading sequence to be used comprises one of the following manners:
   determining the complex-valued spreading sequence to be used according to a fixed configuration of a system, indication signaling sent by the system, identification information of a transmitter, or a random generation manner;
   determining a complex-valued spreading sequence set in which the complex-valued spreading sequence to be used is located according to the fixed configuration of the system, the indication signaling sent by the system or the identification information of the transmitter; and determining the complex-valued spreading sequence to be used from the complex-valued spreading sequence set according to the fixed configuration of the system, the indication signaling sent by the system, the identification information of the transmitter or a random selection manner.

6. The data transmission method according to claim 5, wherein the identification information of the transmitter at least comprises one of: a serial number of the transmitter, an identification number of the transmitter, a position of the transmitter and a network address of the transmitter.

7. The data transmission method according to claim 2, wherein the determining the complex-valued spreading sequence to be used according to the transmission resource comprises one of the following manners:
   determining the complex-valued spreading sequence to be used according to the transmission resource and the identification information of the transmitter based on a rule preset by a system or a random generation manner;
   determining V complex-valued spreading sequence sets associated with transmission resources according to an association relationship, predetermined by the system, between the transmission resources and complex-valued spreading sequence sets, and selecting W complex-valued spreading sequences from the V complex-valued spreading sequence sets as complex-valued spreading sequences to be used according to a fixed configuration of the system, indication signaling sent by the system, identification information of a transmitter, or a random selection manner, wherein V is an integer greater than or equal to 1, and W is an integer greater than or equal to 1.

8. The data transmission method according to claim 7, wherein the association relationship, predetermined by the system, between the transmission resources and the complex-valued spreading sequence sets comprises at least one of:
   a one-to-one corresponding relationship between one transmission resource and one complex-valued spreading sequence set;
   a corresponding relationship between one transmission resource and a plurality of complex-valued spreading sequence sets;

a corresponding relationship between a plurality of transmission resources and one complex-valued spreading sequence set; and a corresponding relationship between a plurality of transmission resources and a plurality of complex-valued spreading sequence sets.

9. The data transmission method according to claim 7, wherein the identification information of the transmitter at least comprises one of: a serial number of the transmitter, an identification number of the transmitter, a position of the transmitter and a network address of the transmitter.

10. The data transmission method according to claim 2, wherein the determining the transmission resource to be used according to the complex-valued spreading sequence comprises: determining Y transmission resources associated with complex-valued spreading sequence sets according to a complex-valued spreading sequence set in which the complex-valued spreading sequence is located and an association relationship, predetermined by a system, between the transmission resources and the complex-valued spreading sequence sets, and selecting Z transmission resources from the Y transmission resources as transmission resources to be used according to a fixed configuration of a system, indication signaling sent by the system or identification information of a transmitter, wherein Y is an integer greater than or equal to 1, and Z is an integer greater than or equal to 1.

11. The data transmission method according to claim 10, wherein the identification information of the transmitter at least comprises one of: a serial number of the transmitter, an identification number of the transmitter, a position of the transmitter and a network address of the transmitter.

12. The data transmission method according to claim 10, wherein the association relationship, predetermined by the system, between the transmission resources and the complex-valued spreading sequence sets comprises at least one of:

a one-to-one corresponding relationship between one transmission resource and one complex-valued spreading sequence set;

a corresponding relationship between one transmission resource and a plurality of complex-valued spreading sequence sets;

a corresponding relationship between a plurality of transmission resources and one complex-valued spreading sequence set; and a corresponding relationship between a plurality of transmission resources and a plurality of complex-valued spreading sequence sets.

13. The data transmission method according to claim 1, wherein the determining a transmission resource to be used comprises: determining the transmission resource to be used based on N transmission resources predetermined by a system, wherein each transmission resource is a transmission resource unit, a transmission resource block or a transmission resource set, and N is an integer greater than or equal to 1.

14. The data transmission method according to claim 1, wherein the determining a complex-valued spreading sequence to be used comprises: determining the complex-valued spreading sequence to be used based on S complex-valued spreading sequence sets predetermined by a system, wherein each complex-valued spreading sequence set comprises X complex-valued spreading sequences with a length of L, and S is an integer greater than or equal to 1, and X is an integer greater than or equal to 1, and L is an integer greater than 1.

15. The data transmission method according to claim 1, wherein the processing a data symbol to be sent by using the complex-valued spreading sequence to generate a symbol sequence comprises: performing a spreading processing on the data symbol to be sent by using the complex-valued spreading sequence to generate the spread symbol sequence.

16. The data transmission method according to claim 1, wherein the sending the symbol sequence through the transmission resource comprises: mapping the symbol sequence to the transmission resource to form transmitting signals, and sending the transmitting signals out.

17. A non-transitory computer readable storage medium where computer executable instructions are stored, and when executed, the computer executable instructions can implement the data transmission method according to claim 1.

18. A data transmission apparatus comprising a processor and a storage device, wherein the storage device stores processor-executable programs, and the programs comprise:

a determining module configured to determine a transmission resource to be used and a complex-valued spreading sequence to be used;

a processing module configured to process a data symbol to be sent by using the complex-valued spreading sequence to generate a symbol sequence; and a sending module configured to send the symbol sequence through the transmission resource, wherein each element of the complex-valued spreading sequence is a complex number, and values of a real part and an imaginary part of each element are both from an M-element real number set, wherein the M is an integer greater than or equal to 2, and the M-element real number set is selected from:

a set formed by M integers within a range of $[-(M-1)/2, (M-1)/2]$, wherein the M is an odd number;

a set formed by M odd numbers within a range of $[-(M-1), (M-1)]$, wherein the M is an even number;

a set formed by M real numbers obtained through multiplying respectively M integers within a range of $[-(M-1)/2, (M-1)/2]$ by specified coefficient(s), wherein the M is an odd number; and a set formed by M real numbers obtained through multiplying respectively M odd numbers within a range of $[-(M-1), (M-1)]$ by specified coefficient(s), wherein the M is an even number.

* * * * *